(12) United States Patent
Lutter

(10) Patent No.: US 8,020,028 B1
(45) Date of Patent: *Sep. 13, 2011

(54) APPLICATION MANAGEMENT SYSTEM FOR MOBILE DEVICES

(75) Inventor: Robert Pierce Lutter, Tacoma, WA (US)

(73) Assignee: Eagle Harbor Holdings, Bainbridge Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/851,488

(22) Filed: Aug. 5, 2010

Related U.S. Application Data

(63) Continuation of application No. 11/616,650, filed on Dec. 27, 2006, now Pat. No. 7,793,136, which is a continuation of application No. 10/132,886, filed on Apr. 24, 2002, now Pat. No. 7,178,049.

(51) Int. Cl.
*G06F 11/00* (2006.01)
(52) U.S. Cl. ............................... 714/1; 718/100
(58) Field of Classification Search .................. 714/1, 2, 714/3, 10–13; 718/1, 100, 101–104, 106, 718/107
See application file for complete search history.

(56) References Cited

U.S. PATENT DOCUMENTS

| | | | |
|---|---|---|---|
| 2,995,318 A | 8/1961 | Cocharo |
| 4,303,978 A | 12/1981 | Shaw |
| 4,528,563 A | 7/1985 | Takeuchi |
| 4,591,976 A | 5/1986 | Webber |
| 4,829,434 A | 5/1989 | Karmel |
| 4,907,159 A | 3/1990 | Mauge |
| 5,008,678 A | 4/1991 | Herman |
| 5,031,330 A | 7/1991 | Stuart |
| 5,045,937 A | 9/1991 | Myrick |
| 5,111,401 A | 5/1992 | Everett, Jr. |
| 5,115,245 A | 5/1992 | Wen |
| 5,245,909 A | 9/1993 | Corrigan |
| 5,287,199 A | 2/1994 | Zoccolillo |
| 5,303,297 A | 4/1994 | Hillis |
| 5,339,086 A | 8/1994 | DeLuca |
| 5,341,301 A | 8/1994 | Shirai |
| 5,438,361 A | 8/1995 | Coleman |

(Continued)

FOREIGN PATENT DOCUMENTS

DE  3125161 A1  1/1983

(Continued)

OTHER PUBLICATIONS

Stolowitz Ford Cowger LLP, Listing of Related Cases, Mar. 15, 2011.

(Continued)

*Primary Examiner* — Dieu-Minh Le
(74) *Attorney, Agent, or Firm* — Stolowitz Ford Cowger LLP

(57) ABSTRACT

An application management system identifies a mobile device for use in a vehicle, home, or place of business, each of which includes a processor and is designed to function in a multiprocessor system. The mobile device is connected and configured into the multiprocessor system when a type of data used by the mobile device conforms to a type of data used in the multiprocessor system. A stored application in the multiprocessor system is identified that employs a same data type utilized on the mobile device. The stored application is run which includes taking over control and operation of the mobile device and process data received from the mobile device. Security is used to allowed to access the multiprocessor system.

34 Claims, 5 Drawing Sheets

U.S. PATENT DOCUMENTS

| | | |
|---|---|---|
| 5,471,214 A | 11/1995 | Faibish |
| 5,506,963 A | 4/1996 | Ducateau |
| 5,532,706 A | 7/1996 | Reinhardt |
| 5,552,773 A | 9/1996 | Kuhnert |
| 5,572,201 A | 11/1996 | Graham |
| 5,581,462 A | 12/1996 | Rogers |
| 5,585,798 A | 12/1996 | Yoshioka |
| 5,617,085 A | 4/1997 | Tsutsumi |
| 5,646,612 A | 7/1997 | Byon |
| 5,749,060 A | 5/1998 | Graf |
| 5,751,211 A | 5/1998 | Nishimura et al. |
| 5,761,320 A | 6/1998 | Farinelli |
| 5,786,998 A | 7/1998 | Neeson |
| 5,794,164 A | 8/1998 | Beckert et al. |
| 5,872,508 A | 2/1999 | Taoka |
| 5,907,293 A | 5/1999 | Tognazzini |
| 5,915,214 A | 6/1999 | Reece |
| 5,943,427 A | 8/1999 | Massie |
| 5,948,040 A | 9/1999 | DeLorme et al. |
| 5,951,620 A | 9/1999 | Ahrens et al. |
| 5,959,536 A | 9/1999 | Chambers |
| 5,963,092 A | 10/1999 | Van Zalinge |
| 5,964,822 A | 10/1999 | Alland |
| 5,966,658 A | 10/1999 | Kennedy, III |
| 5,969,598 A | 10/1999 | Kimura |
| 5,977,906 A | 11/1999 | Ameen |
| 5,983,092 A | 11/1999 | Whinnett |
| 5,983,161 A | 11/1999 | Lemelson |
| 6,009,330 A | 12/1999 | Kennedy, III |
| 6,009,403 A | 12/1999 | Sato |
| 6,028,537 A | 2/2000 | Suman |
| 6,028,548 A | 2/2000 | Farmer |
| 6,032,089 A | 2/2000 | Buckely |
| 6,054,950 A | 4/2000 | Fontana |
| 6,060,989 A | 5/2000 | Gehlot |
| 6,061,709 A | 5/2000 | Bronte |
| 6,075,467 A | 6/2000 | Ninagawa |
| 6,097,285 A | 8/2000 | Curtin |
| 6,128,608 A | 10/2000 | Barnhill |
| 6,148,261 A | 11/2000 | Obradovich |
| 6,150,961 A | 11/2000 | Alewine |
| 6,154,123 A | 11/2000 | Kleinberg |
| 6,161,071 A | 12/2000 | Shuman |
| 6,163,711 A | 12/2000 | Juntunen |
| 6,166,627 A | 12/2000 | Reeley |
| 6,167,253 A | 12/2000 | Farris |
| 6,169,894 B1 | 1/2001 | McCormick |
| 6,175,728 B1 | 1/2001 | Mitama |
| 6,175,782 B1 | 1/2001 | Obradovich |
| 6,181,922 B1 | 1/2001 | Iwai |
| 6,181,994 B1 | 1/2001 | Colson |
| 6,182,006 B1 | 1/2001 | Meek |
| 6,185,491 B1 | 2/2001 | Gray |
| 6,202,027 B1 | 3/2001 | Alland |
| 6,203,366 B1 | 3/2001 | Muller |
| 6,204,804 B1 | 3/2001 | Andersson |
| 6,226,389 B1 | 5/2001 | Lemelson |
| 6,233,468 B1 | 5/2001 | Chen |
| 6,236,652 B1 | 5/2001 | Preston |
| 6,240,365 B1 | 5/2001 | Bunn |
| 6,243,450 B1 | 6/2001 | Jansen |
| 6,252,544 B1 | 6/2001 | Hoffberg |
| 6,275,231 B1 | 8/2001 | Obradovich |
| D448,366 S | 9/2001 | Youngers |
| 6,292,109 B1 | 9/2001 | Murano |
| 6,292,747 B1 | 9/2001 | Amro |
| 6,294,987 B1 | 9/2001 | Matsuda |
| 6,297,732 B2 | 10/2001 | Hsu |
| 6,298,302 B2 | 10/2001 | Walgers |
| 6,314,326 B1 | 11/2001 | Fuchu |
| 6,326,903 B1 | 12/2001 | Gross |
| 6,327,536 B1 | 12/2001 | Tsuji |
| 6,362,748 B1 | 3/2002 | Huang |
| 6,374,286 B1 | 4/2002 | Gee |
| 6,377,860 B1 | 4/2002 | Gray |
| 6,382,897 B2 | 5/2002 | Mattio |
| 6,389,340 B1 | 5/2002 | Rayner |
| 6,401,029 B1 | 6/2002 | Kubota |
| 6,405,132 B1 | 6/2002 | Breed |
| 6,408,174 B1 | 6/2002 | Steijer |
| 6,417,782 B1 | 7/2002 | Darnall |
| 6,421,429 B1 | 7/2002 | Merritt |
| 6,429,789 B1 | 8/2002 | Kiridena |
| 6,429,812 B1 | 8/2002 | Hoffberg |
| 6,430,164 B1 | 8/2002 | Jones |
| 6,442,485 B2 | 8/2002 | Evans |
| 6,445,308 B1 | 9/2002 | Koike |
| 6,452,484 B1 | 9/2002 | Drori |
| 6,484,080 B2 | 11/2002 | Breed |
| 6,493,338 B1 | 12/2002 | Preston |
| 6,496,107 B1 | 12/2002 | Himmelstein |
| 6,496,117 B2 | 12/2002 | Gutta |
| 6,496,689 B1 | 12/2002 | Keller |
| 6,505,100 B1 | 1/2003 | Stuempfle |
| 6,515,595 B1 | 2/2003 | Obradovich |
| 6,522,875 B1 | 2/2003 | Dowling |
| 6,559,773 B1 | 5/2003 | Berry |
| 6,584,403 B2 | 6/2003 | Bunn |
| D479,228 S | 9/2003 | Sakaguchi et al. |
| 6,614,349 B1 | 9/2003 | Proctor et al. |
| 6,615,137 B2 | 9/2003 | Lutter |
| 6,616,071 B2 | 9/2003 | Kitamura |
| 6,622,083 B1 | 9/2003 | Knockeart et al |
| 6,629,033 B2 | 9/2003 | Preston |
| 6,641,087 B1 | 11/2003 | Nelson |
| 6,647,270 B1 | 11/2003 | Himmelstein |
| 6,670,912 B2 | 12/2003 | Honda |
| 6,675,081 B2 | 1/2004 | Shuman |
| 6,681,121 B1 | 1/2004 | Preston |
| 6,690,681 B1 | 2/2004 | Preston |
| 6,707,421 B1 | 3/2004 | Drury et al. |
| 6,708,100 B2 | 3/2004 | Russell |
| 6,714,139 B2 | 3/2004 | Saito |
| 6,725,031 B2 | 4/2004 | Watler |
| 6,734,799 B2 | 5/2004 | Munch |
| 6,738,697 B2 | 5/2004 | Breed |
| 6,771,208 B2 | 8/2004 | Lutter |
| 6,771,629 B1 | 8/2004 | Preston |
| 6,778,073 B2 | 8/2004 | Lutter |
| 6,778,924 B2 | 8/2004 | Hanse |
| 6,782,315 B2 | 8/2004 | Lu |
| 6,785,551 B1 | 8/2004 | Richard |
| 6,792,351 B2 | 9/2004 | Lutter |
| 6,816,458 B1 | 11/2004 | Kroon |
| 6,895,238 B2 | 5/2005 | Newell |
| 6,895,240 B2 | 5/2005 | Laursen |
| 6,901,057 B2 | 5/2005 | Rune |
| 6,906,619 B2 | 6/2005 | Williams |
| 6,920,129 B2 | 7/2005 | Preston |
| 6,925,368 B2 | 8/2005 | Funkhouser et al. |
| 6,937,732 B2 | 8/2005 | Ohmura |
| 6,952,155 B2 | 10/2005 | Himmelstein |
| 6,972,669 B2 | 12/2005 | Saito |
| 6,973,030 B2 | 12/2005 | Pecen |
| 6,993,511 B2 | 1/2006 | Himmelstein |
| 7,000,469 B2 | 2/2006 | Foxlin |
| 7,006,950 B1 | 2/2006 | Greiffenhagen |
| 7,024,363 B1 | 4/2006 | Comerford |
| 7,079,993 B2 | 7/2006 | Stephenson |
| 7,089,206 B2 | 8/2006 | Martin |
| 7,092,723 B2 | 8/2006 | Himmelstein |
| 7,120,129 B2 | 10/2006 | Ayyagari |
| 7,123,926 B2 | 10/2006 | Himmelstein |
| 7,146,260 B2 | 12/2006 | Preston |
| 7,151,768 B2 | 12/2006 | Preston |
| 7,158,956 B1 | 1/2007 | Himmelstein |
| 7,164,662 B2 | 1/2007 | Preston |
| 7,171,189 B2 | 1/2007 | Bianconi |
| 7,178,049 B2 | 2/2007 | Lutter |
| 7,187,947 B1 | 3/2007 | White |
| 7,206,305 B2 | 4/2007 | Preston |
| 7,207,042 B2 | 4/2007 | Smith |
| 7,215,965 B2 | 5/2007 | Fournier et al. |
| 7,221,669 B2 | 5/2007 | Preston |
| 7,239,949 B2 | 7/2007 | Lu |
| 7,249,266 B2 | 7/2007 | Margalit |
| 7,257,426 B1 | 8/2007 | Witkowski |

| | | | |
|---|---|---|---|
| 7,269,188 | B2 | 9/2007 | Smith |
| 7,272,637 | B1 | 9/2007 | Himmelstein |
| 7,274,988 | B2 | 9/2007 | Mukaiyama |
| 7,277,693 | B2 | 10/2007 | Chen |
| 7,283,567 | B2 | 10/2007 | Preston |
| 7,283,904 | B2 | 10/2007 | Benjamin |
| 7,286,522 | B2 | 10/2007 | Preston |
| 7,317,696 | B2 | 1/2008 | Preston |
| 7,343,160 | B2 | 3/2008 | Morton |
| 7,375,728 | B2 | 5/2008 | Donath |
| 7,379,707 | B2 | 5/2008 | DiFonzo |
| 7,411,982 | B2 | 8/2008 | Smith |
| 7,418,476 | B2 | 8/2008 | Salesky |
| 7,450,955 | B2 | 11/2008 | Himmelstein |
| 7,506,020 | B2 | 3/2009 | Ellis |
| 7,508,810 | B2 | 3/2009 | Moinzadeh |
| 7,509,134 | B2 | 3/2009 | Fournier et al. |
| 7,587,370 | B2 | 9/2009 | Himmelstein |
| 7,594,000 | B2 | 9/2009 | Himmelstein |
| 7,596,391 | B2 | 9/2009 | Himmelstein |
| 7,599,715 | B2 | 10/2009 | Himmelstein |
| 7,614,055 | B2 | 11/2009 | Buskens et al. |
| 7,664,315 | B2 | 2/2010 | Woodfill |
| 7,733,853 | B2 | 6/2010 | Moinzadeh et al. |
| 7,747,281 | B2 | 6/2010 | Preston |
| 7,848,763 | B2 | 12/2010 | Fournier et al. |
| 2001/0009855 | A1 | 7/2001 | L'Anson |
| 2002/0012329 | A1 | 1/2002 | Atkinson |
| 2002/0022927 | A1 | 2/2002 | Lemelson et al. |
| 2002/0070852 | A1 | 6/2002 | Trauner et al. |
| 2002/0095501 | A1 | 7/2002 | Chiloyan et al. |
| 2002/0105423 | A1 | 8/2002 | Rast |
| 2002/0144010 | A1 | 10/2002 | Younis |
| 2003/0060188 | A1 | 3/2003 | Gidron |
| 2004/0162064 | A1 | 8/2004 | Himmelstein |
| 2004/0164228 | A1 | 8/2004 | Fogg |
| 2005/0009506 | A1 | 1/2005 | Smolentzov |
| 2005/0070221 | A1 | 3/2005 | Upton |
| 2005/0130656 | A1 | 6/2005 | Chen |
| 2005/0153654 | A1 | 7/2005 | Anderson |
| 2005/0260984 | A1 | 11/2005 | Karabinis |
| 2005/0275505 | A1 | 12/2005 | Himmelstein |
| 2005/0278712 | A1 | 12/2005 | Buskens et al. |
| 2007/0115868 | A1 | 5/2007 | Chen |
| 2007/0115897 | A1 | 5/2007 | Chen |
| 2008/0092140 | A1 | 4/2008 | Doninger et al. |
| 2010/0312433 | A1* | 12/2010 | Preston et al. ............ 701/36 |

FOREIGN PATENT DOCUMENTS

| | | |
|---|---|---|
| DE | 4237987 | 5/1994 |
| DE | 19922608 | 11/2000 |
| DE | 19931161 | 1/2001 |
| EP | 0 441 576 A2 | 8/1991 |
| EP | 841648 | 5/1998 |
| EP | 1 355 128 | 10/2003 |
| JP | 10-076115 | 10/1999 |
| JP | 2000207691 A | 7/2000 |
| WO | WO9624229 A1 | 8/1996 |
| WO | WO9908436 A1 | 2/1999 |
| WO | WO9957662 A2 | 11/1999 |
| WO | WO9965183 A2 | 12/1999 |
| WO | WO 0029948 | 5/2000 |
| WO | WO0040038 A2 | 7/2000 |
| WO | WO0130061 A1 | 4/2001 |
| WO | WO0158110 A2 | 8/2001 |

OTHER PUBLICATIONS

A. Das, R. Fierro, V. Kumar, J. Ostrowski, J. Spletzer, and C. Taylor, "A Framework for Vision Based Formation Control", IEEE Transactions on Robotics and Automation, vol. 18, Nov. 5, 2001, pp. 1-13.
Ada 95 Transition Support—Lessons Learned, Sections 3, 4, and 5, CACI, Inc. -Federal, Nov. 15, 1996, 14 pages.
AMIC. Architecture specification release 1, 2001; 35 pages.
Bluetooth Doc; Advance Audio Distribution Profile Specification; Adopted version 1.0; dated May 22, 2003; 75 pages.
Bluetooth Doc; Audio/Video Remote Control Profile; Version 1.0 Adopted; dated May 22, 2003; 52 pages.
Bluetooth Hands-free Profile 1.5 Nov. 25, 2005.
Bluetooth Specification version 1.1; Feb. 22, 2001; 452 pages.
Boeing News Release, "Boeing Demonstrates JSF Avionics Multi-Sensor Fusion", Seattle, WA, May 9, 2000, pp. 1-2.
Boeing Statement, "Chairman and CEO Phil Condit on the JSF Decision", Washington, D.C., Oct. 26, 2001, pp. 1-2.
Counterair: The Cutting Edge, Ch. 2 "The Evolutionary Trajectory The Fighter Pilot-Here to Stay?" AF2025 v3c8-2, Dec. 1996, pp. 1-7.
Counterair: The Cutting Edge, Ch. 4 "The Virtual Trajectory Air Superiority without an "Air" Force?" AF2025 v3c8-4, Dec. 1996, pp. 1-12.
Embedded Bluetooth Migrates to Lisbon and Seattle; 11 pages; Jan. 23, 2008.
Green Hills Software, Inc., "The AdaMULTI 2000 Integrated Development Environment," Copyright 2002, printed Jul. 9, 2002; 7 pages.
H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, 2001, pp. 1-6.
Hitachi Automated Highway System (AHS), Automotive Products, Hitachi, Ltd., Copyright 1994-2002, 8 pages.
IEEE Standard for Information Technology—POSIX Based Supercomputing Application Environment Profile; Jun. 14, 1995, 72 pages.
ISIS Project: Sensor Fusion, Linkoping University Division of Automatic Control and Communication Systems in cooperation with SAAB (Dynamics and Aircraft), 2001, 18 pages.
J. Takezaki, N. Ueki, T. Minowa, H. Kondoh, "Support System for Safe Driving—A Step Toward ITS Autonomous Driving—", Hitachi Review, vol. 49, Nov. 3, 2000, pp. 1-8.
Joint Strike Fighter Terrain Database, ets-news.com "Simulator Solutions" 2002, 3 pages.
Luttge, Karsten; "E-Charging API: Outsource Charging to a Payment Service Provider"; IEEE; 2001 (pp. 216-222).
M. Chantler, G. Russel, and R. Dunbar, "Probabilistic Sensor Fusion for Reliable Workspace Sensing", Fourth IARP workshop on Underwater Robotics, Genoa, Nov. 1992, pp. 1-14.
MSRC Redacted Proposal, 3.0 Architecture Development, Aug. 29, 2002; pp. 1-43.
MyGig User Guide.
Powerpoint Presentation by Robert Allen—Boeing Phantom Works entitled "Real-Time Embedded Avionics System Security and COTS Operating Systems", Open Group Real-Time Forum, Jul. 18, 2001, 16 pages.
Product description of Raytheon Electronic Systems (ES), Copyright 2002, pp. 1-2.
Product description of Raytheon RT Secure, "Development Environment", Copyright 2001, pp. 1-2.
Product description of Raytheon RT Secure, "Embedded Hard Real-Time Secure Operating System", Copyright 2000, pp. 1-2.
Product description of Raytheon RT Secure, Copyright 2001, pp. 1-2.
S.G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1-5.
Specification of the Bluetooth System v1.0.B; Dec. 1, 1999.
Specification of the Bluetooth System v1.1; Feb. 22, 2001.
TNO FEL Annual Review 1998: Quality works, Observation Systems Division; "The Whole is More Than the Sum of its Parts"; 16 pages.
Vehicle Dynamics Lab, University of California, Berkeley, funded by BMW, current members: D. Caveney and B. Feldman, "Adaptive Cruise Control", at least as early as 2002, printed Jul. 2, 2002; 17 pages.
Stirling A: "Mobile Multimedia platforms" Vehicular Technology Conferene Fall 2000. IEEE VTS Fall VTC2000. 52nd Vehicular Technology Conference (CAT. No. 00CH37152).
Nusser R. et al.: "Bluetooth-based wireless connectivity in an automotive environment" Vehicular Technoloty Conference Fall 2000. IEEE VTS Fall VTC2000 52nd Vehicular Techonlogy Conference (Cat. No. 00CH37152).

Martins e f v et al. "design of an OS9 operating system extension for a message-passing multiprocesor" Microprocessors and Microsysetms, IPC Business Press LT. London, BG, vol. 21, No. 9, Apr. 1, 1998, pp. 533-543.

Gutierrez Garcia JJ et al. "Minimizing the effects of jitter in distributed hard real-time systems" Journal of Systems Architecture, Elsevier Science Publishers BV., Amsterdam, NL, vol. 41, No. 6/7. Dec. 15, 1996, pp. 431-447.

International Search Report for PCT/US02/020402; Mailing date Apr. 3, 2003.

International Search Report for PCT/US02/020403; Mailing date Jan. 27, 2003.

International Search Report for PCT/US02/016364; Mailing date Feb. 14, 2003.

International Search Report for PCT/US02/016371; Mailing date Aug. 18, 2003.

Stolowitz Ford Cowger LLP Listing of Related Cases; Aug. 23, 2010.

Stolowitz Ford Cowger LLP, Listing of Related Cases, Jan. 4, 2011.

* cited by examiner

APPLICATION MANAGEMENT SYSTEM FOR MOBILE DEVICES

This application is a continuation of U.S. patent application Ser. No. 11/616,650, filed Dec. 27, 2006 entitled: METHOD FOR MULTI-TASKING MULTIPLE JAVA VIRTUAL MACHINES IN A SECURE ENVIRONMENT, which is a continuation of U.S. Pat. No. 7,178,049 issued Feb. 13, 2007 entitled: METHOD FOR MULTI-TASKING MULTIPLE JAVA VIRTUAL MACHINES IN A SECURE ENVIRONMENT, which are both incorporated by referenced in their entirety.

This application incorporates by reference U.S. patent application Ser. No. 09/841,753, filed Apr. 24, 2001 entitled: OPEN COMMUNICATION SYSTEM FOR REAL-TIME MULTIPROCESSOR APPLICATIONS and U.S. patent application Ser. No. 09/841,915, filed Apr. 24, 2001 entitled: METHOD AND APPARATUS FOR DYNAMIC CONFIGURATION OF MULTIPROCESSOR SYSTEM.

BACKGROUND OF THE INVENTION

Java is a robust, object-oriented programming language expressly designed for use in the distributed environment of the Internet. Java can be used to create complete applications that may run on a single computer or be distributed among servers and clients in a network. A source program in Java is compiled into byte code, which can be run anywhere in a network on a server or a client that has a Java virtual machine (JVM).

A JVM describes software that is nothing more than an interface between the compiled byte code and the microprocessor or hardware platform that actually performs the program's instructions. Thus, the JVM makes it possible for Java application programs to be built that can run on any platform without having to be rewritten or recompiled by the programmer for each separate platform.

Jini is a distributed system based on the idea of federating groups of users and the resources required by those users. Resources can be implemented either as hardware devices, software programs, or a combination of the two. The Jini system extends the Java application environment from a single virtual machine to a network of machines. The Java application environment provides a good computing platform for distributed computing because both code and data can move from machine to machine. The Jini infrastructure provides mechanisms for devices, services, and users to join and detach from a network. Jini systems are more dynamic than is currently possible in networked groups where configuring a network is a centralized function done by hand.

However, the Java/Jini approach is not without its disadvantages. Both Java and Jini are free, open source applications. The Java application environment is not designed for controlling messaging between different machines. For example, the Java application is not concerned about the protocols between different hardware platforms. Jini has some built-in security that allows code to be downloaded and run from different machines in confidence. However, this limited security is insufficient for environments where it is necessary to further restrict code sharing or operation sharing among selected devices in a secure embedded system.

SUMMARY OF THE INVENTION

The present invention allows construction of a secure, real-time operating system from a portable language such as Java that appears to be a Java virtual machine from a top perspective but provides a secure operating system from a bottom perspective. This allows portable languages, such as Java, to be used for secure embedded multiprocessor environments.

The foregoing and other objects, features and advantages of the invention will become more readily apparent from the following detailed description of a preferred embodiment of the invention which proceeds with reference to the accompanying drawings.

DETAILED DESCRIPTION

A Java application stack includes a Java layer 5 for running any one of multiple different applications. In one example, the applications are related to different vehicle operations such as Infrared (IR) and radar sensor control and monitoring, vehicle brake control, vehicle audio and video control, environmental control, driver assistance control, etc.

A Java Virtual Machine (JVM) layer 16 provides the hardware independent platform for running the Java applications 5. A Jini layer 12 provides some limited security for the Java applications that run on different machines. However, the Jini layer 12 does not provide the necessary reconfiguration and security management necessary for a distributed real-time multiprocessor system.

A Secure Real-time Executive (SRE) 14 provides an extension to the JVM 16 and allows Java to run on different processors for real-time applications. The SRE 20 manages messaging, security, critical data, file I/O multiprocessor task control and watchdog tasks in the Java environment as described below. The JVM 16, Jini 12 and SRE 14 can all be implemented in the same JVM 10, However, for explanation purposes, the JVM 10 and the SRE 14 will be shown as separate elements.

Figure 1:
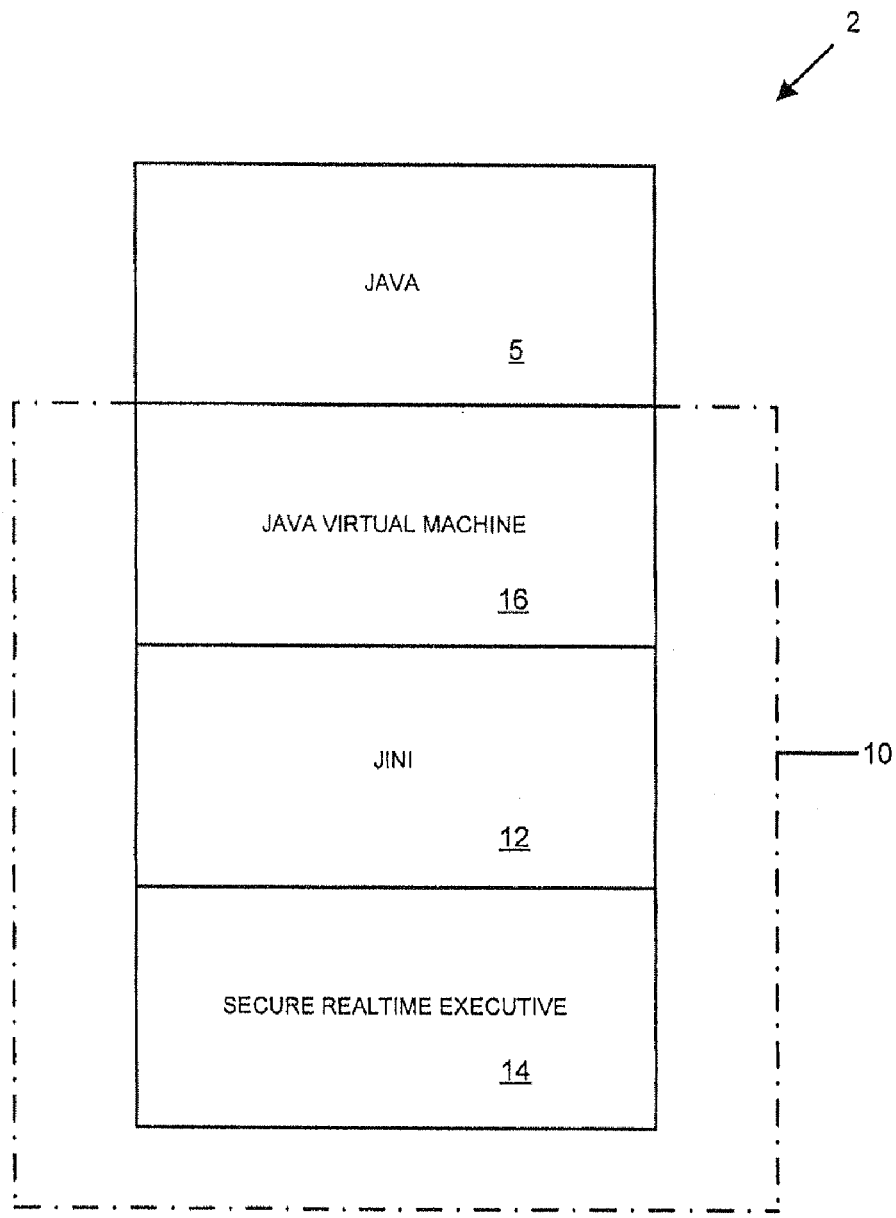
FIG. 1 is a diagram showing a Java stack with an additional Secure Real-time Executive (SRE) layer.
Figure 2:
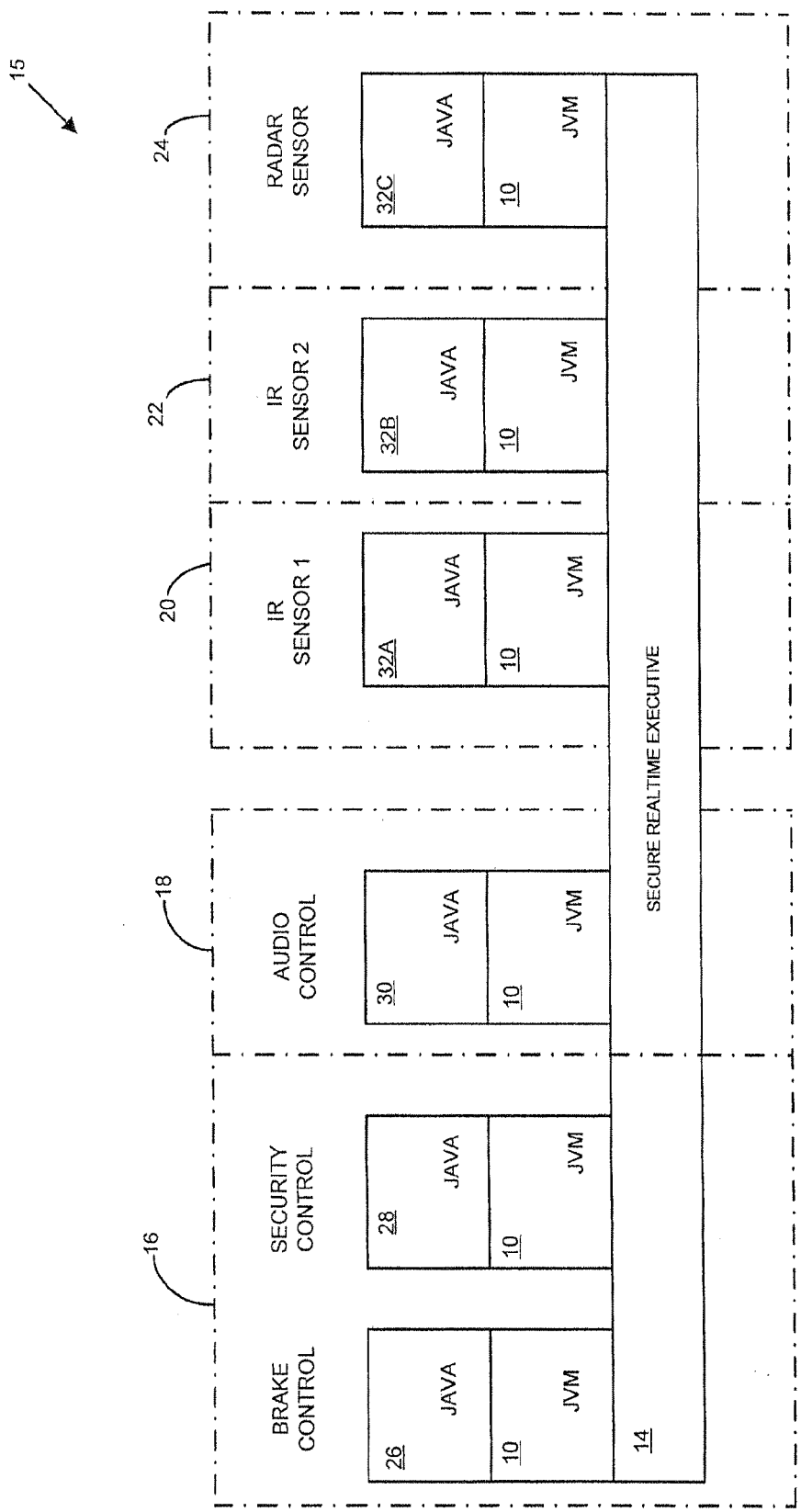
FIG. 2 is a diagram of a multiprocessor system that runs multiple Java Virtual Machines that each include a SRE.

FIG. 2 shows a system 15 that includes multiple processors 16, 18, 20, 22 and 24. Each processor includes one or more JVMs 10 that run different Java applications. For example, processor 16 includes one Java application 28 that controls a vehicle security system and another Java application 26 that controls the vehicles antilock brakes. A processor 18 includes a Java application 30 that controls audio sources in the vehicle. Other processors 20 and 22 may run different threads 32A and 32B for the same sensor fusion Java application 32 that monitors different IR sensors. Another thread 32C on processor 24 monitors a radar sensor for the sensor fusion Java application 32.

The SRE 14 runs below the JVMs 10 in each processor and control tasks, messaging, security, etc. For example, the Java application 26 controls vehicle braking according to the sensor data collected by the sensor fusion Java application 32. The SRE 14 in one example prevents unauthorized data from being loaded into the processor 16 that runs brake control application 26. The SRE 14 also prevents other Java applications that are allowed to be loaded into processor 16 from disrupting critical braking operations, or taking priority over the braking operations, performed by Java application 26.

For example, the SRE 14 may prevent noncritical vehicle applications, such as audio control, from being loaded onto processor 16. In another example, noncritical operations, such as security control application 28, are allowed to be loaded onto processor 16. However, the SRE 14 assigns the security messages low priority values that will only be processed when there are no braking tasks in application 26 that require processing by processor 16.

The SRE 14 allows any variety of real-time, mission critical, nonreal-time and nonmission critical Java applications to be loaded onto the multiprocessor system 15. The SRE 14 then automatically manages the different types of applications and messages to ensure that the critical vehicle applications are not corrupted and processed with the necessary priority. The SRE 14 is secure software that cannot be manipulated by other Java applications.

The SRE 14 provides priority preemption on a message scale across the entire system 15 and priority preemption on a task scale across the entire system 15. So the SRE 14 controls how the JVMs 10 talk to each other and controls how the JVMs 10 are started or initiated to perform tasks. The SRE 14 allows programmers to write applications using Java in a safe and secure real time environment. Thus, viruses can be prevented by SRE 14 from infiltrating the system 15.

While the explanation uses Java as one example of a programming environment where SRE 14 can be implemented, it should be understood that the SRE 14 can be integrated into any variety of different programming environments that may run in the same or different systems 15. For example, SRE 14 can be integrated into an Application Programmers Interface (API) for use with any programming language such as C++.

Figure 3:
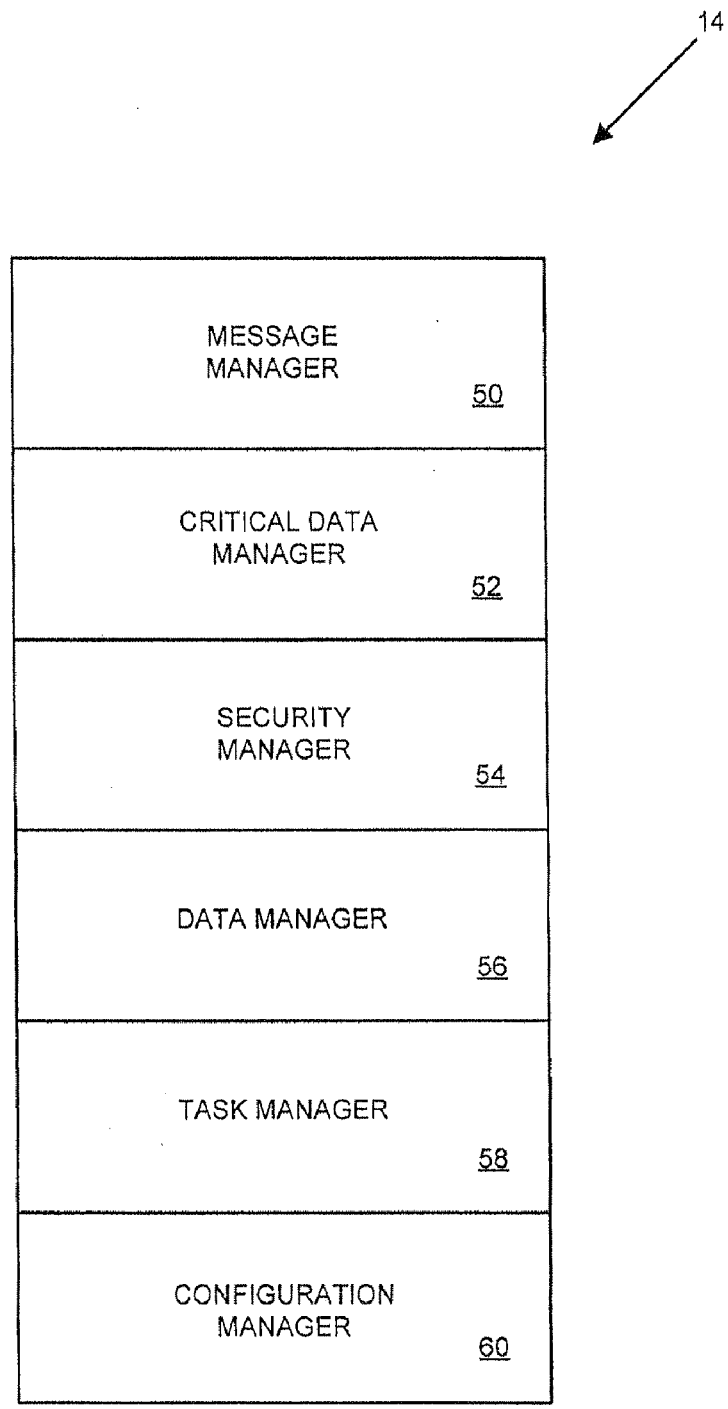
FIG. 3 is a detailed diagram of the managers in the SRE.

FIG. 3 shows the different functions that are performed by the SRE 20. Any combination of the functions described below can be provided in the SRE 20. A message manager 50 controls the order messages are received and transmitted by the different Java applications. A security manager 52 controls what data and messages are allowed to be received or transmitted by different Java applications. A critical data manager 54 controls what data is archived by the different Java applications.

A data manager 56 controls what data is allowed to be transferred between different processors. A task manager 58 controls the order tasks are performed by the different JVMs. A reconfiguration manager 60 monitors the operation of the different processors in the system and reassigns or reconfigures Java applications and Java threads to different processors according to what processors have failed or what new processors and applications have been configured into system 15.

The message manager 50 partially corresponds to the priority manager 44 shown in FIG. 2 of pending patent application Ser. No. 09/841,753, the critical data manager 52 partially corresponds with the logging manager 44 shown in FIG. 2 of the copending '753 patent application, and the security manger 54 a least partially corresponds with the security manager 40 shown in the '753 patent application. The data manager 56 at least partially corresponds with the data manager 42 shown in FIG. 2 of pending patent application Ser. No. 09/841,915, the task manager 58 partially corresponds to the device manger 46 shown in FIG. 2 of the '915 application, and the configuration manager 60 at least partially corresponds to the configuration manager 44 shown in FIG. 2 of the '915 patent application. The descriptions of how the different managers 50-60 operate similarly to the corresponding managers in the 753 and '915 patent applications are herein incorporated by reference and are therefore not described in further detail.

However, some specific tasks performed by the managers 50-60 are described below in further detail.

Figure 4:
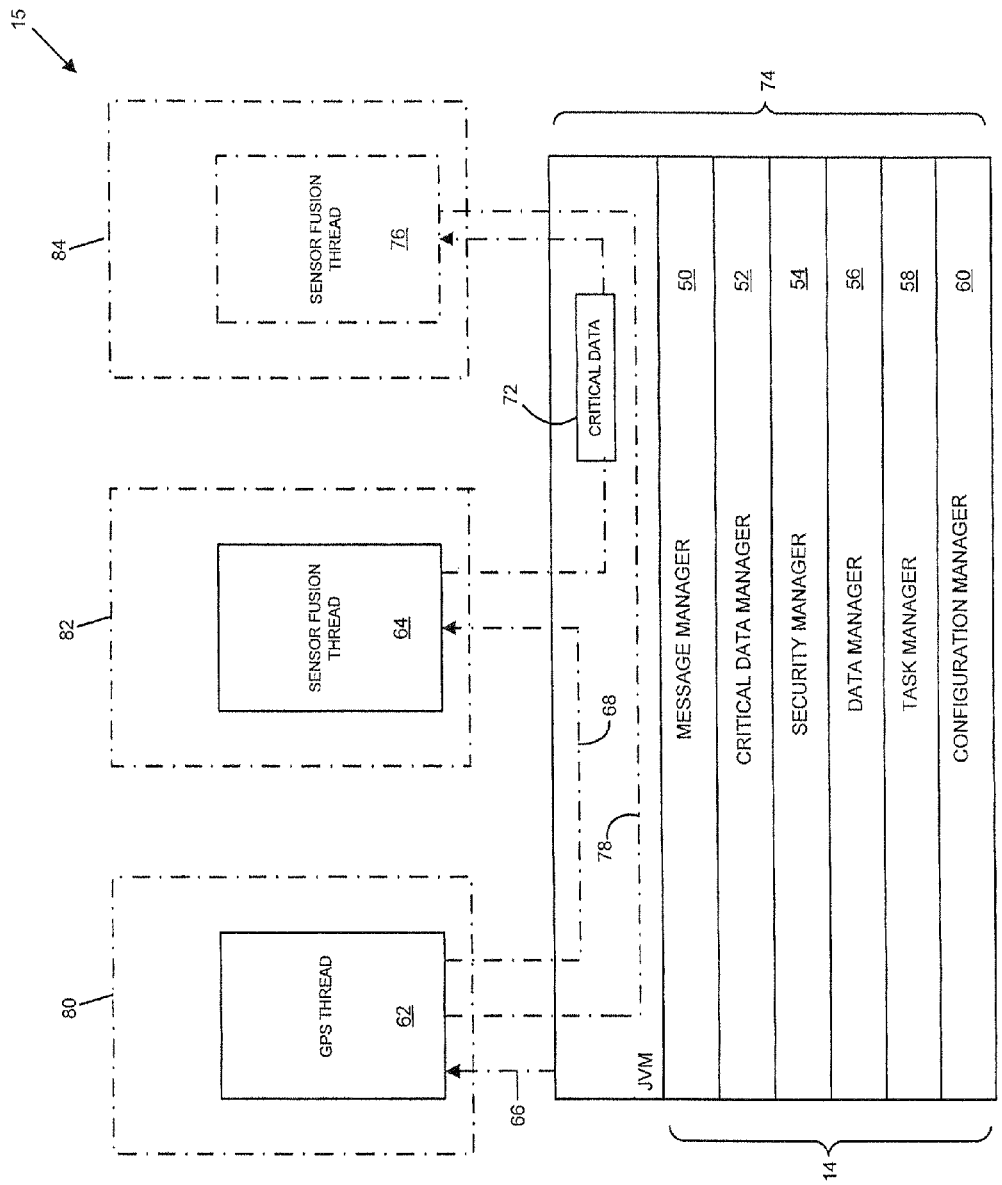
FIG. 4 is a block diagram of how the SRE manages a multiprocessor system.

FIG. 4 shows in more detail how the SRE 14 operates. One of the operations performed by the task manager 58 is to control when different tasks are initiated on different processors. For example, a first Global Positioning System (GPS) thread 62 is running on a JVM in a processor 80. Another sensor fusion thread 64 is running on a different processor 82. Block 74 represents the Java Virtual Machine operating in each of processors 80 and 82. A master JVM 74 may run on either processor 80, processor 82 or on some other processor.

The task manager 58 sends an initiation command 66 to the GPS thread 62 to obtain location data. The task manager 58 then directs the obtained GPS data 68 through a link to the sensor fusion thread 64 for subsequent processing of GPS data 68. The link may be any bus, such as a PCI bus, serial link such as a Universal Serial Bus, a wireless link such as blue tooth or IEEE 802.11, or a network link such as Ethernet, etc.

The configuration manager 60 acts as a watchdog to make sure that the GPS thread 62 and the sensor fusion thread 64 are each running correctly. In one example, separate configuration managers 60 in each processor 80 and 82 sends out periodic signals to the other configuration managers 60 in the other processors. Any one of the configuration managers 60 can detect a processor or application failure by not receiving the periodic "ok" signals from any one of the other processors for some period of time. If a failure is detected, then a particular master configuration manager 60 in one of the processors determines where the task in the failed processor is going to be reloaded. If the master configuration manager 60 dies, then some conventional priority scheme, such as round robin, is used to select another configuration master.

If a failure is detected, say in the processor 82 that is currently performing the sensor fusion thread 64, a message is sent from the configuration manager 60 notifying the task manager 58 which processor is reassigned the sensor fusion thread. In this example, another sensor fusion thread 76 in processor 84 is configured by the configuration manager 60.

The critical data manager 52 manages the retention of any critical data 72 that was previously generated by the sensor fusion thread 64. For example, the critical data manager 54 automatically stores certain data and state information that was currently, being used in the sensor fusion thread 64. The critical data may include GPS readings for the last 10 minutes, sensor data obtained from sensors in other processors in the vehicle over the last 10 minutes. The critical data may also include any processed data generated by the sensor fusion thread 64 that identifies any critical vehicle conditions.

The critical data manager 52 also determines which data to archive generally for vehicle maintenance and accident reconstruction purposes.

The configuration manager 60 directs the critical data 72 to the new sensor fusion thread 76. The task manager 74 then redirects any new GPS data obtained by the GPS thread 78 to the new sensor fusion thread 76 and controls sensor fusion tasks from application 76. Thus, the configuration manager 60 and the task manager 58 dynamically control how different Java threads are initialized, distributed and activated on different processors.

The message manager 50 determines the priority of sent and received messages. If the data transmitted and received by the sensor fusion thread 76 is higher priority than other data transmitted and received on the processor 84, then the sensor fusion data will be given priority over the other data.

The task manager 58 controls the priority that the sensor fusion thread 76 is giving by processor 84. If the sensor fusion thread 76 has higher priority than, for example, an audio application that is also being run by processor 84, then the sensor fusion thread 76 will be performed before the audio application.

The SRE 14 can be implemented in any system that needs to be operated in a secure environment. For example, network servers or multiprocessors operating in a home environment. The multiprocessors in home appliances, such as washer and dryers, home computers, home security systems, home heating systems, can be networked together and operate Java applications. The SRE 14 prevents these multiple processors and the software that controls these processors from being corrupted by unauthorized software and also allows the applications on these different processors to operate as one integrated system.

The SRE 14 is a controlled trusted computing based that is not accessible by non-authorized application programmers and anyone in the general public. Therefore, the SRE 14 prevents hacking or unauthorized control and access to the processors in the vehicle.

Task Controlled Applications

Debugging is a problem with multiprocessor systems. The task manager 58 allows the Java applications to be run in a lock-step mode to more effectively identify problems in the multiprocessor system 15.

Figure 5:
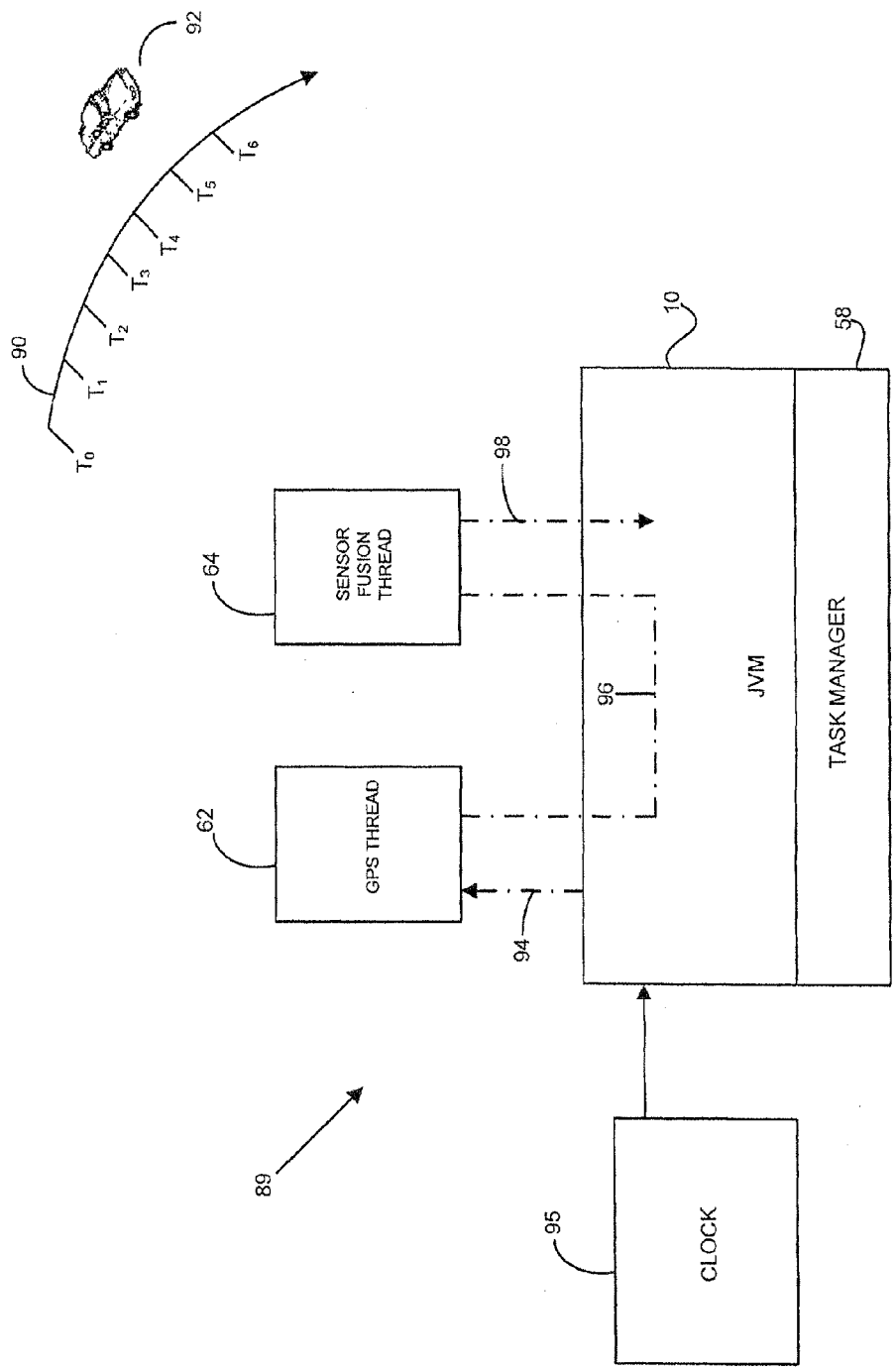
FIG. 5 is a bock diagram showing how a task manager in the SRE operates the multiprocessor system in a lock-step mode.

FIG. 5 shows a path 90 taken by a vehicle 92. In one application, the position of the vehicle 92 is sampled every second $t_1$, $t_2$, $t_3$, $t_4$, etc. The position of the vehicle 92 is sampled by a GPS receiver in vehicle 92 that reads a longitudinal and latitudinal position from a GPS satellite. The GPS receiver is controlled by the GPS thread 62 that receives the GPS data and then sends the GPS data to a sensor fusion thread 64 that may run on the same or a different processor in the vehicle 92. The sensor fusion thread 64 can perform any one of many different tasks based on the GPS data. For example, the sensor fusion thread 64 may update a map that is currently being displayed to the driver of vehicle 92 or generate a warning signal to the vehicle driver.

For each sample period $t_N$, the task manager 58 sends a request 94 to the GPS thread 62 to obtain GPS data. The task manager 58 uses a clock 96 as a reference for identifying each one second sample period. Each time a second passes according to clock 96, the task manager 58 sends out the request 94 that wakes up the GPS thread 62 to go read the GPS data from the GPS satellite. Once the GPS data has been received, the GPS thread 62 passes the UPS data 96 to the sensor fusion thread 64. The GPS thread 62 then goes back into an idle mode until it receives another activation command from the task manager 58.

The task manager 58 can control when the GPS thread 62 is woken up. Instead of the GPS thread 62 being free running, the GPS thread 62 is operating according to a perceived time controlled by the task manager 58. The task manager 58 may send the activation request 94 to the GPS thread 62 once every second during normal sensor fusion operation. When the system is in a debug mode, however, the task manager 58 may only send one activation command 94. This allows the other operations performed by the system 89 to be monitored and determine how the single sampling of GPS data 96 propagates through system 89. The task manager 58 may also delay or disable task initiation to other threads, so that the processing of the GPS data 96 can be isolated.

The task manager 58 can isolate any state in the overall system 89, such as the state of system 89 after a first GPS reading by GPS thread 62 or the state of system 89 after the thirty second GPS reading by GPS thread 62 by controlling when and how often activation commands 94 are sent to UPS thread 62. In a similar manner, the task manager 58 can control when other tasks are performed by the system 89, such as when the sensor fusion thread 64 is activated.

Thus, the task manager 58 controls when Java applications are activated effectively running the overall system 89 in a lock-step mode. The task manager 58 can control the initiation of multiple tasks at the same time. This allows the task manager to control what parameters and operations are performed and used by the different Java threads so that different states in the multiprocessor system 89 can be detected and monitored more effectively.

One application for the task controlled applications is for accident reconstruction. The critical data manager 52 (FIG. 3) may save different vehicle parameters from a vehicle that has been in an accident. For example, sensor data, brake data, speed data, etc. The task manager 58 can feed the saved data into the different Java applications in a lock-step mode to determine how each Java thread processes the saved data. This can then be used to identify any failures that may have occurred in the system 89.

The system described above can use dedicated processor systems, micro controllers, programmable logic devices, or microprocessors that perform some or all of the communication operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. An application management system for a multiprocessor system, comprising:
   one or more processors coupled together into a multiprocessor system, wherein at least one of the processors in the multiprocessor system is configured to:
      operate a transceiver configured to detect a new device within communication range of the multiprocessor system;
      detect a protocol used by the new device;
      configure the multiprocessor system to communicate with the new device when the protocol conforms with a protocol used in the multiprocessor system;
      identify a particular type of data used in the new device and processed with a first software application controlled and operated by the new device;
      identify a second software application from among multiple different software applications located in a memory in the multiprocessor system, wherein the second software application is currently not loaded in or operated by any the on board processors in the multiprocessor system, and wherein the second software application is also configured to process the same particular type of data processed by the first software application controlled and operated by the new device;

download a copy of the second software application selected from the memory to one of the multiple processors in the multiprocessor system;

configure said processor to run the second software application moved from the memory, wherein running the second software application causes said processor to take over control and operation of the new device;

initiate transfer of the data from the new device to said processor and initiate processing of the particular type of data received from the new device with the second software application running on said processor; and prevent at least one of an unauthorized device, unauthorized application, or unauthorized data from accessing at least some of the software applications or data in the multiprocessor system.

2. The application management system of claim 1 wherein the multiprocessor system is further configured to monitor for at least one of a failure in an application in a newly added device, a failure in a processor in the newly added device, or a failure in a communications link with the newly added device.

3. The application management system of claim 1 wherein the multiprocessor system is configured to:

detect a first and second one of the new devices that generate streaming audio data;

disconnect the streaming audio data generated from the first one of the detected new devices currently connected to the speakers; and connect streaming audio data generating from the second one of the detected new devices to the speakers according to at least one of a priority level set in at least one of the processors and inputs received from a display coupled to the multiprocessor system.

4. The application management system of claim 1 wherein the detected new device has an integrated display screen.

5. The application management system of claim 4 wherein at least a portion of content displayed on the display screen of the detected new device is communicated to a display processor in the multiprocessor system for display and generation of information on a display processor display.

6. The application management system of claim 1 wherein the detected new device includes a data storage device selected from the group of a hard disk drive, solid state device, or compact disk.

7. The application management system of claim 1 wherein the detected new device is a wired or wireless audio output device.

8. The application management system of claim 1 wherein the detected new device includes wireless speakers or wireless headphones.

9. The application management system of claim 1 wherein a data storage coupled to the multiprocessor system includes a readable and writeable data storage media selected from the group of solid state device, hard disk drive, or compact disk.

10. The application management system of claim 1 wherein a display processor in the multiprocessor system is coupled to a multimedia system.

11. The application management system of claim 10 wherein the multimedia system receives signals from multiple sources.

12. The application management system of claim 11 wherein the multimedia system is wired to speakers.

13. The application management system of claim 1 wherein the detected new device runs a global positioning system application.

14. The application management system of claim 1 including an external memory, and wherein one of the multiple processors is configured to:

detect a data source when the new device is connected to one of the multiple processors;

identify the detected data source; and communicate the identity of the detected data source to a display processor in the multiprocessor system for indication on the display.

15. The application management system of claim 1 wherein a display in the multiprocessor system includes a user interface that includes a touch screen.

16. The application management system of claim 15 wherein the user interface initiates control operations carried out by one or more of the processors in the multiprocessor system.

17. The application management system of claim 15 wherein the user interface generates feedback to a user, which feedback is derived from information displayed on the display.

18. A method for reconfiguring applications in a multiprocessor, comprising:

operating a wireless device manager in at least one processor in the multiprocessor system, the wireless device manager configured to:

a. monitor for wireless signals from a new device not currently coupled to the multiprocessor system, wherein the new device runs a first software application that processes a first type of data; and b. wirelessly connect the new device to the multiprocessor system;

operating a configuration manager in one of the multiple processors in the multiprocessor system, the configuration manager configured to:

c. monitor operations of the multiple processors in the multiprocessor system;

d. identify data codes in the wireless signals from the new device and use the data codes to identify the first type of data processed by the first software application running on the new device;

e. responsive to identifying the data codes from the new device, select a second software application from among multiple different software applications stored within memory in the multiprocessor system, wherein the second software application is associated with the first type of data processed by the new device and is not currently loaded into one of the multiple processors in the multiprocessor system;

f. download a copy of the second software application selected from the memory to one of the multiple processors in the multiprocessor system;

g. reconfigure one of the multiple processors in the multiprocessor system to run the second software application downloaded from the memory and take over control and operation of the new device; and h. process data from the new device with the second software application operating in and controlled by the particular one of the multiple processors in the multiprocessor system; and i. operating a security manager configured to determine authority to access at least some of the new devices, software applications or data used in the multiprocessor system.

19. The method of claim 18 wherein the new device is an audio device, and further comprising receiving streaming audio data from the audio device with one of the multiple processors in the multiprocessor system.

20. The method of claim 18 wherein the new device is at least one of a cellular telephone, navigation system and video system.

21. The method of claim 18 wherein the new device is an audio device that includes an integrated display screen.

22. The method of claim 21 further comprising a display, and communicating at least a portion of content displayed on the integrated display screen of the new device to the display.

23. The method of claim 18 wherein the new device includes a data storage device selected from the group of a hard disk drive, solid state device, or compact disk, and further comprising wirelessly receiving data from the data storage device with one of the processors in the multiprocessor system.

24. The method of claim 18 wherein the new device is a wired or wireless speaker, and further comprising communicating audio signals from one of the processors in the multiprocessor system to the speaker.

25. The method of claim 22 wherein the display communicates with a multimedia system.

26. The method of claim 25 further comprising receiving at the multimedia system signals from multiple sources.

27. The method of claim 18 wherein the new device comprises a global positioning device, and further comprising receiving with the global positioning device data from a satellite network.

28. The method of claim 22 wherein the multiprocessor system includes a plurality of speakers, and further comprising (i) displaying images representing at least some of the speakers on the display in the vehicle, and (ii) operating one of the multiple processors to route audio signals from the detected audio device to selected ones of the speakers represented on the display.

29. The method of claim 22 further comprising:
operating the device manager to monitor for wireless signals from at least a second new device not currently coupled to the multiprocessor system;
determining whether a wireless communication interface used by the second new device is compatible with at least one protocol used in the multiprocessor system;
adding the second new device to the multiprocessor system; and
using the second new device in the multiprocessor system.

30. The method of claim 29 further comprising operating the first and second new devices to communicate with the multiprocessor system using Bluetooth signals.

31. A multiprocessor system, comprising:
multiple processors operating together as a multiprocessor system, wherein the multiprocessor system is a distributed processing system configured to:
identify a new device that is not currently coupled to the multiprocessor system,
connect the new device to the multiprocessor system when signaling from the new device conforms to a communication protocol used in the multiprocessor system,
configure the new device into the multiprocessor system,
identify data codes in the signaling from the new device identifying an application running on the new device, a data type used on the new device, and a security attribute associated with at least one of data stored in the new device and the application running on the new device,
use the identified security attribute to prevent at least one of an unauthorized applications and unauthorized data from being processed by the multiprocessor system,
identify at least one of a stored application in memory accessible by the multiprocessor system, wherein the application processes the same type of data processed by the new device,
responsive to identifying the stored application, download the stored application from memory into at least one processor in the multiprocessor system, and
use the application to process data received from the new device, and
select an appropriate human machine interface to output the data.

32. The multiprocessor system of claim 31 wherein the multiprocessor system is positioned within proximity to, or located within a personal dwelling comprised at least one of:
a computer server, associated with the personal dwelling;
an appliance, wherein the appliance is an apparatus, or device for a particular purpose or use, and wherein the appliance is at least one of:
a washing machine,
a dryer,
a personal computer,
a cooking appliance,
a home security appliance,
a home lighting appliance,
a multimedia appliance,
an audio management appliance,
a network appliance,
a home environmental control appliance, and
a vehicle appliance.

33. The multiprocessor system of claim 31 wherein the security attribute prevents a corruption in the operation or execution of any task controlled by one or more of the multiple processors or identified software applications by any unauthorized application or software code.

34. The multiprocessor system of claim 33 wherein the security attribute allows for any two or more of the identified applications executing on the different processors to operate as one or more integrated systems.

* * * * *

UNITED STATES PATENT AND TRADEMARK OFFICE
Certificate

Patent No. 8,020,028 B1                                           Patented: September 13, 2011

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: Robert Pierce Lutter, Tacoma, WA (US); and Dan Alan Preston, Bainbridge Island, WA (US).

Signed and Sealed this Twenty-ninth Day of April 2014.

SCOTT BADERMAN
*Supervisory Patent Examiner*
Art Unit 2114
Technology Center 2100